United States Patent

Bush

[11] 3,893,660
[45] July 8, 1975

[54] PISTON RING EXPANDER SPRING
[75] Inventor: E. Crosby Bush, Corry, Pa.
[73] Assignee: Associated Spring Corporation, Bristol, Conn.
[22] Filed: Nov. 28, 1973
[21] Appl. No.: 419,628

[52] U.S. Cl. .............................................. 267/1.5
[51] Int. Cl. ........................................... F16f 1/34
[58] Field of Search ..................................... 267/1.5

[56] References Cited
UNITED STATES PATENTS

| | | | |
|---|---|---|---|
| 501,560 | 7/1893 | Cooper et al. | 267/1.5 |
| 2,610,846 | 9/1952 | Hanna | 267/1.5 |
| 2,778,697 | 1/1957 | Nuttall | 267/1.5 |
| 2,879,117 | 3/1959 | Ellis | 267/1.5 |

Primary Examiner—James B. Marbert
Attorney, Agent, or Firm—Scrivener Parker Scrivener and Clarke

[57] ABSTRACT

In a helical spring which is formed into annular shape and used in a groove of a piston behind the piston ring to exert a radially outward force on the ring, the outer ring-engaging surface of each coil of the spring is formed with the same curvature as the inner surface of the piston ring in order to reduce or eliminate wear resistance between the two parts. One surface of the stock from which the spring is coiled is so pre-shaped that the coiling operation modifies the shape of this surface and produces the desired finished curvature of the outer surface of each coil. The space between adjacent coils of the spring is less than the width of the stock, whereby there will be no intermeshing of the end coils when the spring is brought to annular shape.

2 Claims, 6 Drawing Figures

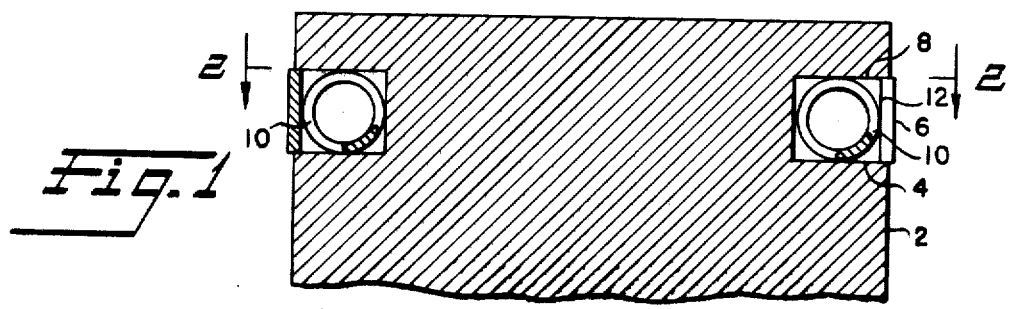
Fig.1
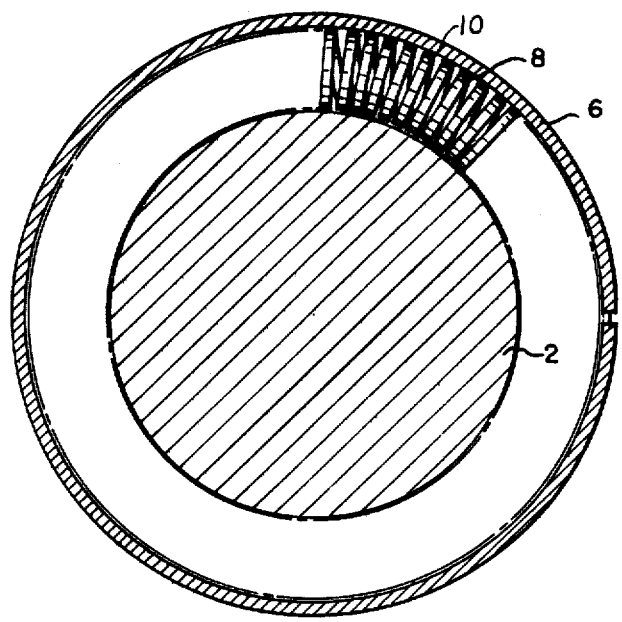
Fig.2
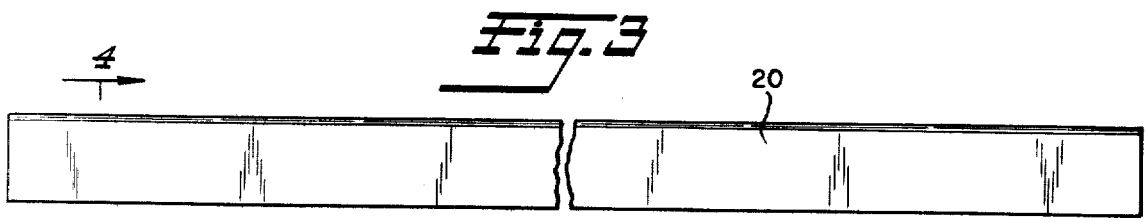
Fig.3
Fig.4  Fig.5
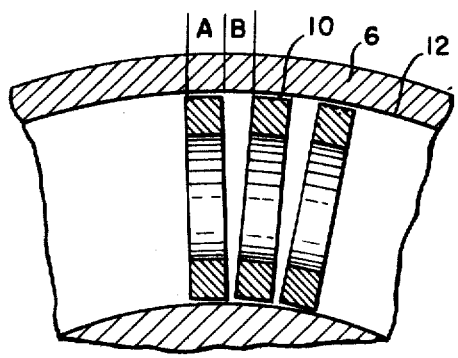
Fig.6

PISTON RING EXPANDER SPRING

BACKGROUND OF THE INVENTION

It is usual to provide resilient means positioned in the ring groove of a piston behind the piston ring for urging the piston ring outwardly into engagement with the wall of the cylinder in which the piston operates. Such piston ring expanders, as the resilient means are known, take many forms including springs formed of flat strip material and helical springs formed into annular shape. All of such expander devices, regardless of the form of the spring, bear against the inner surface of the piston ring and in the operation of the piston the parts turn with respect to each other causing wear and resistance to relative turning movement. It has been the object of this invention to provide an expander ring of the helical spring type in which the outer ring-engaging surface of each convolution is shaped to conform to the curvature of the inner surface of the piston ring, and also to provide a method of forming a helical spring having such a configuration of the ring-engaging surface of each convolution. in addition, it has been an object of the invention to provide a helical spring having such a relation between the width of each convolution and the shape between adjacent convolutions that when the spring is formed into annular shape its end coils will not intermesh.

SUMMARY OF THE INVENTION

The invention provides a helical spring formed into annular shape and positioned in the ring groove of a piston and constructed and adapted to urge the piston ring outwardly, the outer ring-engaging surface of each convolution of the spring having a curvature which is the same as that of the inner surface of the piston ring. This curvature of each convolution of the spring is produced by changing the shape of the corresponding surface of the stock from which the spring is coiled by coiling pressure. The width of each convolution of the spring is made greater than the space between adjacent convolutions, thus preventing intermeshing of the end convolutions when the spring is formed into annular shape.

DESCRIPTION OF THE DRAWINGS

FIG. 1 is a partial vertical sectional view through a piston, showing the ring groove, the piston ring and the expander spring provided by the invention;

FIG. 2 is a sectional view taken on line 2—2 of FIG. 1;

FIG. 3 is an elevational view of a length of stock from which the expander spring according to the invention may be formed;

FIG. 4 is a sectional view taken on line 4—4 of FIG. 3;

FIG. 5 is a view which is similar to FIG.4 but shows the cross-sectional shape after the stock is formed into helical shape, and FIG. 6 shows adjacent convolutions of the expander spring in the ring groove of a piston, and illustrates the width and spacing relation of the spring coils in accordance with the invention.

DESCRIPTION OF THE INVENTION

In FIG. 1 of the drawings there is disclosed the upper part of a conventional piston 2, having in its peripheral surface the ring groove 4 in which there is positioned a piston ring 6 which engages the cylinder wall, which is not shown. Also positioned in the ring groove and behind the piston ring there is a piston ring expander 8 which, in the present invention, takes the form of a helical spring formed into annula shape as most clearly shown in FIG. 2. Each coil of this spring has the same configuration, which is that provided by this invention, and this is shown most clearly in FIG. 6 which is an enlarged view of a few of the coils of the spring. In this figure it will be seen that the outer surface 10 of each coil of the spring is curved in a direction axially of the spring itself and circumferentially of the spring in its installed, annular position, and that such curvature of each such surface corresponds to the circumferential curvature of the inner surface 12 of the piston ring 6.

The outer surface of each coil of the spring engages the inner surface of the piston ring, and as these parts have relative motion during operation of the piston friction and wear are developed between them which result, in known ring and expander assemblies, in undesirable wear of both parts causing frequent replacement. This wear and friction are reduced and substantially eliminated by reason of the provision of corresponding curvatures of the engaging parts as provided by this invention.

The present invention provides a new and preferred method of producing the desired configuration of the outer surface of each coil of the spring which is described with reference to FIGS. 3, 4 and 5 of the drawings. In accordance with this method the spring is formed from a length of stock, which is illustrated at 20 in FIG. 3, which has the proper dimensions and one surface 22 of which, which will become the outer surface of each coil of the spring, is formed with a transverse curvature of relatively small radius as shown in FIG. 4. In the process of winding the stock into a helix this surface is changed from the curvature of smaller radius to a shape of greater radius, as shown in FIG. 5, which corresponds to the curvature of the inner surface of the piston ring with which the spring is to be assembled. Thus, the inside diameter of the piston ring provides the curvature with which the radius of the finished surface 24 is to be mated. The parameters of the original surface 22 are developed by basic spring formulas which are used to determine the correct load and safe working stress as required in a specific design. The dimensions of the stock 20 and the original shape of the surface 22 determine the amount of alteration of that surface which will occur in forming the stock to helical shape, resulting from the upset and flow of material of the stock. The dimensions and shape are used in spring making formulas to predict the transition in configuration of the stock caused by the coiling pressure, and these formulas and the application thereof to any specific design of the ring-engaging surface of the finished spring are conventional and provided in text books and need not be repeated here for the benefit of those skilled in the art to which this invention relates.

In forming the helical spring into annular shape to provide a piston ring expander, the ends of the spring must be brought together and it is important that they do not intermesh. In accordance with the invention and as illustrated in FIG. 6, the width of each coil of the spring which is indicated at A is made greeater than the pitch of the spring coils when the spring is formed into its annular shape, this pitch being indicated at B in FIG. 6. Thus, by reason of this relation of dimensions the end coils are prevented from intermeshing when brought together.

I claim:

1. A helical spring constructed and adapted to be positioned in the ring groove of a piston behind the piston ring with the outer surface of each of its coils in engagement with the inner surface of the piston ring, in which the outer surface of each coil of the spring has a curvature circumferentially of the annular spring which corresponds to the circumferential curvature of the inner surface of the piston ring.

2. A helical spring constructed and adapted to be formed into annular shape, in which the width of each coil is greater than the spacing between adjacent coils thereby to prevent intermeshing of the end coils when the spring is formed into annular shape.

* * * * *